United States Patent
Kumar et al.

(10) Patent No.: US 10,013,387 B2
(45) Date of Patent: Jul. 3, 2018

(54) METHOD OR APPARATUS FOR FLEXIBLE FIRMWARE IMAGE MANAGEMENT IN MICROSERVER

(71) Applicant: Cisco Technology, Inc., San Jose, CA (US)

(72) Inventors: Ganesh A. Kumar, Bangalore (IN); Yogindar Das Yasodhar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 14/824,458

(22) Filed: Aug. 12, 2015

(65) Prior Publication Data
US 2016/0364244 A1   Dec. 15, 2016

(30) Foreign Application Priority Data
Jun. 11, 2015  (IN) ............................ 2929/CHE/2015

(51) Int. Cl.
| | |
|---|---|
| *G06F 13/42* | (2006.01) |
| *G06F 3/06* | (2006.01) |
| *G06F 13/40* | (2006.01) |
| *G06F 9/445* | (2018.01) |
| *G06F 9/4401* | (2018.01) |

(52) U.S. Cl.
CPC .......... *G06F 13/4282* (2013.01); *G06F 3/061* (2013.01); *G06F 3/0632* (2013.01); *G06F 3/0655* (2013.01); *G06F 3/0688* (2013.01); *G06F 8/665* (2013.01); *G06F 9/4405* (2013.01); *G06F 13/4022* (2013.01)

(58) Field of Classification Search
None
See application file for complete search history.

(56) References Cited

U.S. PATENT DOCUMENTS

| | | | | |
|---|---|---|---|---|
| 2009/0037899 A1* | 2/2009 | Dharap | ...................... | G06F 8/65 717/173 |
| 2012/0025953 A1* | 2/2012 | Swanson | ................. | H04L 45/02 340/10.1 |
| 2012/0042184 A1* | 2/2012 | Yeh | ........................ | G06F 1/3203 713/323 |
| 2013/0166896 A1* | 6/2013 | Peng | ...................... | G06F 13/102 713/2 |
| 2013/0332639 A1* | 12/2013 | Jiang | ................... | G06F 13/4022 710/300 |

(Continued)

FOREIGN PATENT DOCUMENTS

| | | |
|---|---|---|
| CN | 1831774 A | 9/2006 |
| CN | 100576173 C | 12/2009 |

OTHER PUBLICATIONS

International Search Report dated Sep. 9, 2016 cited in Application No. PCT/US2016/037248, 16 pgs.

(Continued)

*Primary Examiner* — Nitin Patel
(74) *Attorney, Agent, or Firm* — Merchant & Gould P.C.

(57) ABSTRACT

Methods and systems are disclosed which may consolidate a flash management entity using IO virtualization. The consolidation may occur in a centralized location. Furthermore, a boot strap may be created to allow booting of the micro server from a virtualized firmware management entity.

13 Claims, 3 Drawing Sheets

(56) References Cited

U.S. PATENT DOCUMENTS

2015/0089022 A1* 3/2015 Husain ............... H04L 67/1095
709/219

OTHER PUBLICATIONS

Yang et al., "Compass: A Data Center Bootloader for Software Defined Infrastructure," ICNS 2015: The Eleventh International Conference on Networking and Services, May 24-29, 2015, pp. 98-103, XP002761316, ISBN: 978-1-61208-404-6, retrieved from the Internet: URL:https://www.thinkmind.org.
Schwerdel et al., "Fugure Internet Research and Experimentation: The G-Lab Approach," Computer Networks, vol. 61, Mar. 14, 2014, pp. 102-117, XP028632311, ISSN: 1389-1286.
Bakshi, "Considerations for Software Defined Networking (SDN): Approaches and Use Cases," Aerospace Conference, 2013 IEEE, Mar. 2, 2013, 8 pgs., XP032397050, DOI: 10.1109/AERO.2013.6496914, ISBN: 978-1-4673-1812-9.
Bakshi, "Network Considerations for Open Source Based Clouds," 2015 IEEE Aerospace Conference, Mar. 7, 2015, 9 pgs., XP032782806, DOI: 10.1109/AERO.2015.7118997, ISBN: 978-1-4799-5379-0.
International Preliminary Report on Patentability dated Dec. 12, 2017 cited in Application No. PCT/US2016/037248, 12 pgs.

* cited by examiner

METHOD OR APPARATUS FOR FLEXIBLE FIRMWARE IMAGE MANAGEMENT IN MICROSERVER

CROSS-REFERENCE TO RELATED APPLICATION

This application claims priority to Indian Patent Application No. 2929/CHE/2015, filed Jun. 11, 2015, which is entirely incorporated herein by reference.

TECHNICAL FIELD

The present disclosure relates generally to flash management in micro server environments, specifically, the consolidation of a flash management entity using input/output (IO) virtualization.

BACKGROUND

The current generation of micro servers may comprise a server management entity that may provide communication to a host chassis. The communication may be addresses through Inter-Integrated Circuit (I2C). Such communication may result in a lack of remote firmware update capability. Present approaches may employ four flash chips on each cartridge on a micro server. Such approaches result in high cost per cartridge and creates a number of motherboard routing issues.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
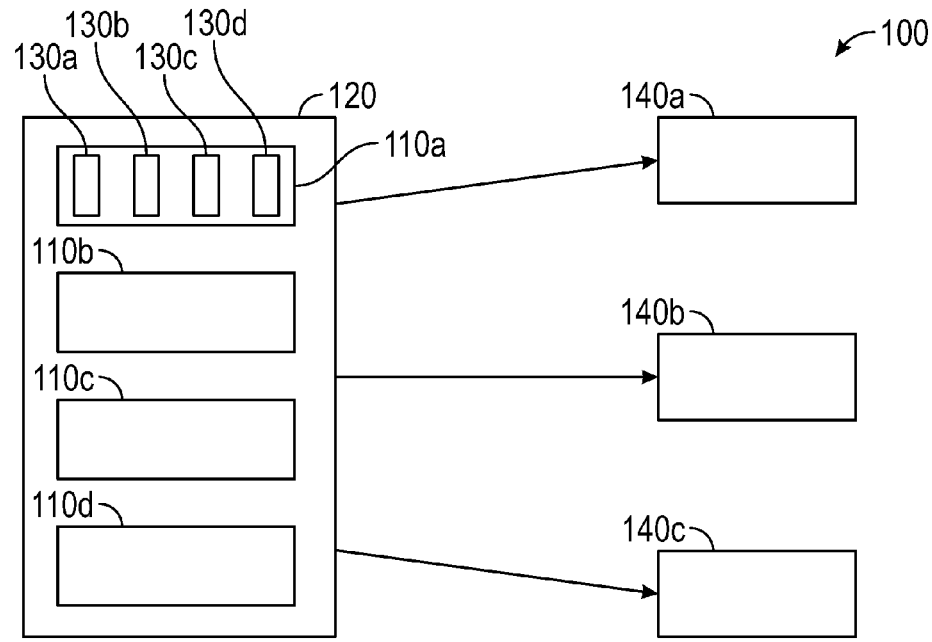
FIG. 1 illustrates a sample network topology where embodiments of the present disclosure may be performed.

Methods and systems are disclosed which may consolidate a flash management entity using IO virtualization. The consolidation may occur in a centralized location. Furthermore, a boot strap may be created to allow booting of the micro server from a virtualized firmware management entity.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates a sample network topology that will be used in the following description to illustrate embodiments of the present disclosure. The described network topology may exist in a networking environment 100. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices. Networking environment 100 may further include a plurality of gateways (not shown), for example, but not limited to cable modems, routers, switches, set top boxes, and computers. Networking environment 100 may include any combination of wide area networks (WANs), local area networks (LANs), or other networks suitable for packet-type communications, such as Internet communications.

Networking environment 100 may be designed to transmit a stream of data packets from one network device to other network devices. Networking environment 100 may comprise any number of network devices both inside and outside the confines of a network fabric. Network devices may be routers, bridges, fabric edge nodes, or other network devices capable of receiving and transmitting a data stream from a source network device to a destination network device. For example, a microserver 110a may be capable of transmitting data to any number of network devices, such as network devices 140a, 140b, and 140c. Specifically, in embodiments of the present disclosure any of the described network devices may operate the disclosed embodiments of the present disclosure. Network devices generally are discussed in further detail in regards to FIG. 3.

Flash management entities running in microservers, such as microserver 110a may be individual entities that operate on a per cartridge basis. Embodiments of the present disclosure may consolidate the flash management entity using IO virtualization. The consolidation may occur in a centralized location. Furthermore, a boot strap may be created to allow booting of microserver 110a from a virtualized firmware management entity.

Embodiments of the present disclosure may serve to minimize the number of components required for a given microserver. The minimization of such components may result in an increase in available space in the microserver layout as a plurality of microservers, such as 110a, 110b, 110c, and 110d may be stacked to comprise a server rack 120. Furthermore, embodiments of the present disclosure may minimize the design costs for microserver hardware.

Advantages provided by the present embodiments include the ability to re-use the firmware management entity across multiple cartridges, such as cartridges 130a, 130b, 130c, and 130d as contained in microserver 110a. Embodiments of the present disclosure may present the ability to provide online updating capabilities for the microserver. Also, cross-processor architecture support may be provided in the same chassis (or blade).

In some embodiments, a firmware flash management entity may be virtualized using a remote IO virtualization controller. To achieve this, a PCH boot strap may be added to the remote IO virtualization controller.

A microserver, such as microserver 110a may be viewed as a server network device, which may be based on a system-on-chip (SoC) architecture. In SoC architecture, a single ASIC may implement all the module functions: from ingress buffering, to forwarding lookups and access control lists (ACLs) and quality-of-service (QoS) tables, to fabric interfaces and virtual output queuing (VOQ). For example, each SoC may manage four front-panel interfaces. Each of the front-panel interfaces may comprise a cartridge, such as cartridge 130a.

Each cartridge, such as cartridge 130a may comprise four flash chips. In some embodiments, a cartridge may have any number of flash chips. The flash chips may be used in microserver 110a to communicate with at least a boot FLASH interface on microserver 110a. These flash chips may connected via Peripheral Component Interconnect (PCI) slots and provide independent high-speed storage to the microserver. However, the number of flash chips required in such a configuration creates a large cost per cartridge and creates motherboard routing issues.

Figure 2:
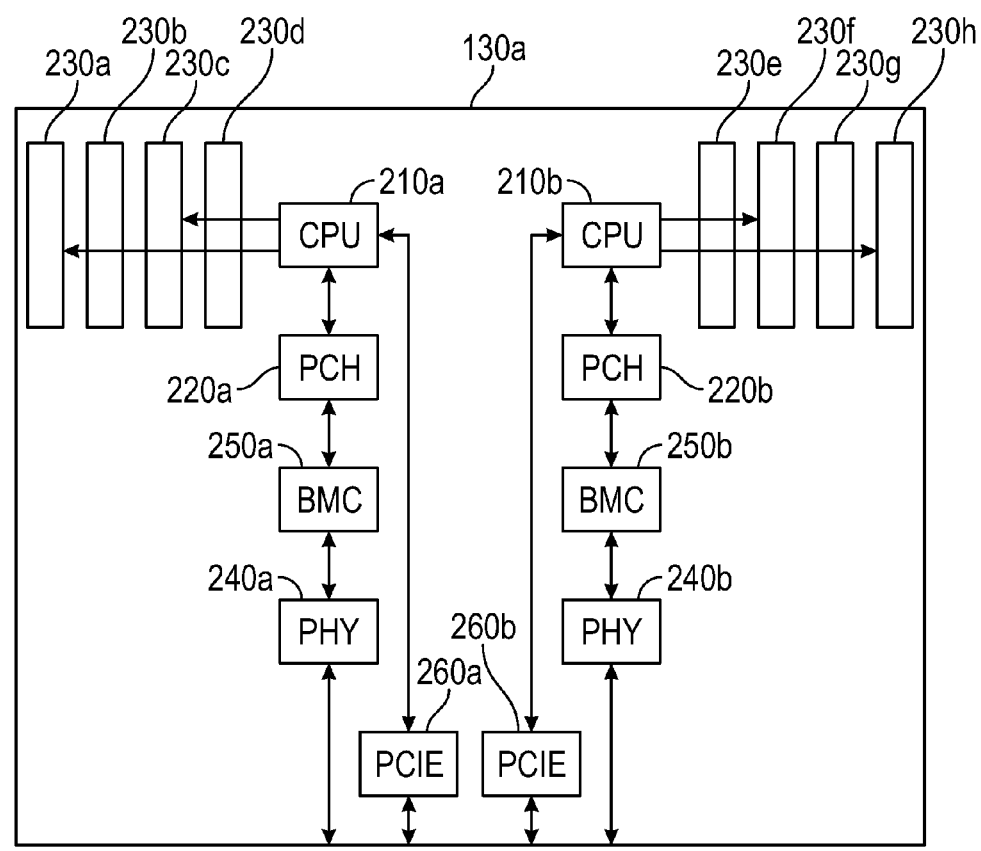
FIG. 2 illustrates a cartridge, such as cartridge 130a, according to embodiments of the present disclosure.

FIG. 2 illustrates a cartridge, such as cartridge 130a, according to embodiments of the present disclosure. Cartridge 130a may manage components of 110a, including monitoring sensors associated with at least CPUs 210a and 210b, Platform Controller Hubs (PCH) 220a and 220b, and a plurality of dual in-line memory modules (DIMMs) 230a, 230b, 230c, 230d, 230e, 230f, 230g, and 230h. In some embodiments, a microserver chassis may support eight cartridges. In some embodiments, cartridge 130a may comprise a single-socket CPU 210a and 210b on each of two independent server nodes. In some embodiments of the present disclosure, cartridge 130a may comprise any number of sockets. Cartridge 130a may have an internal management network for accessing the independent server nodes through at least PHY layers 240a and 240b.

Cartridge 130a may also comprise two dedicated baseboard management controllers (BMCs) 250a and 250b. Cartridges, such as cartridge 130a may be viewed at as plug-and-play devices that may be hot-pluggable to a chassis of microserver 110a. In some embodiments, cartridge 130a may comprise virtual interface cards (such as PCI Express adapters 260a and 260b) that provide direct communication to CPUs 210a and 210b. Virtual interface cards 260a and 260b may provide virtual interfaces, which can be dynamically configured so that both their interface type (network interface card [NIC] or host bus adapter [HBA]) and identity (MAC address and worldwide name [WWN]) may be established using just-in-time provisioning.

Embodiments of the present disclosure may virtualize a current firmware flash chip management entity on the cartridge as a centralized IO Virtualized controller. First, a PCH may be bootstrapped to a remote IO virtualized controller. When a cartridge that is connected to a network is powered up and boots its operating system, the system may request an IP address assignment. The booting process may be achieved by identifying a network location of a boot image as well.

After bootstrapping, General Purpose Input and Output (GPIO)-based identification may be provided for the cartridge's processor subsystem. Next, the PCH boot strap may be dynamically routed based on the processor and IO subsystem. The virtualized firmware flash management entity present in the IO virtualized controller may provide ease of deployment of booting protocols and other maintenance and protocols for patching the firmware of a microserver.

In the instance of providing booting code through the IO virtualized controller, a server management entity may generate a pulse (for example, 5 seconds width) for the powering up of the SoC. In some embodiments of the present disclosure, a server management entity may be a BMC used to manage the motherboard.

Next, a processor entity, such as the CPU may wait for a signal that indicates that the correct power level has been reached. At this point the CPU may fetch a booting instruction from a reset vector. The reset vector may be a location within the CPU that contains the first instruction to be executed upon a reset (re-booting). The processor entity may then fetch the first instruction.

In some embodiments of the present disclosure, the SoC may be responsible for fetching the reset code from the PCI device (virtual interface card) populated by the IO virtualized controller. The reset vector on the CPU may contain a firmware entry point. The remainder of the firmware code may then be fetched from the virtualized flash management entity being operated by the IO virtualized controller. The IO virtualized controller may read the firmware code into its local storage and provide the copy of the firmware to appropriate cartridges.

In some embodiments of the present disclosure, the IO virtualized controller may increment a server counter value for the firmware file. Such a counter may provide information to determine how many network devices are actively referring to the firmware image provided by the virtualized flash management entity.

While embodiments of the present disclosure may provide for providing firmware for the booting of a network device, individual network device firmware upgrade may also be provided. For example, a server management entity may download a firmware image from a central location. Next, the server management entity may call a protocol interface requesting a firmware update through the IO virtualized controller. Upon receipt of the of the firmware image, the IO virtualized controller may create a new file in a file system local to the IO virtualized controller. When the network device is rebooted, the new firmware update may be automatically applied.

In some embodiments of the present disclosure, the centralized IO virtualized controller may be provided as a single virtualization chip on the network device instead of requiring a plurality of flash chips per cartridge. The virtualization chip may provide for up to 16 host PCI Express interfaces. In some embodiments of the present disclosure, the virtualization chip may provide for any number of host PCI Express interfaces. Such a set up may enable centralized IO Virtualized control for network devices, such as density optimized servers, I/O modules, and Top of Rack (ToR) devices. The virtualization chip may further provide a PCI Express root complex which serves to enable the connection of a disaggregated network device using shared storage.

In some embodiments of the present disclosure, the virtualization chip may provide a dual user interface, where each user interface supports 40G Ethernet or 4×10G Ethernet port channels. The virtualization chip may further provide a 1G management port for the management of network device activities. In some embodiments of the present disclosure, the virtualization chip may provide management ports at any available speed. The virtualization chip may further support up to 2048 logical interfaces (LIFs) that allow the configuration of the same VLAN identification on different primary interfaces.

In some embodiments of the present disclosure, the virtualization chip may support up to 16000 unicast or multicast virtual network tags (VNTags). The VNTags may serve to tag individual packets generated by the IO virtualized controller to provide unique identification. The virtualization chip may further comprise a Ternary Content Addressable Memory (TCAM). For example, the TCAM may contain a number (e.g. 8000) of forwarding entries for fast lookups and forwarding decisions. In some embodiments, a 2K LIF table may specify a TCAM key for classification purposes. The TCAM key may provide the information necessary for a network device to perform a lookup on the TCAM.

Figure 3:
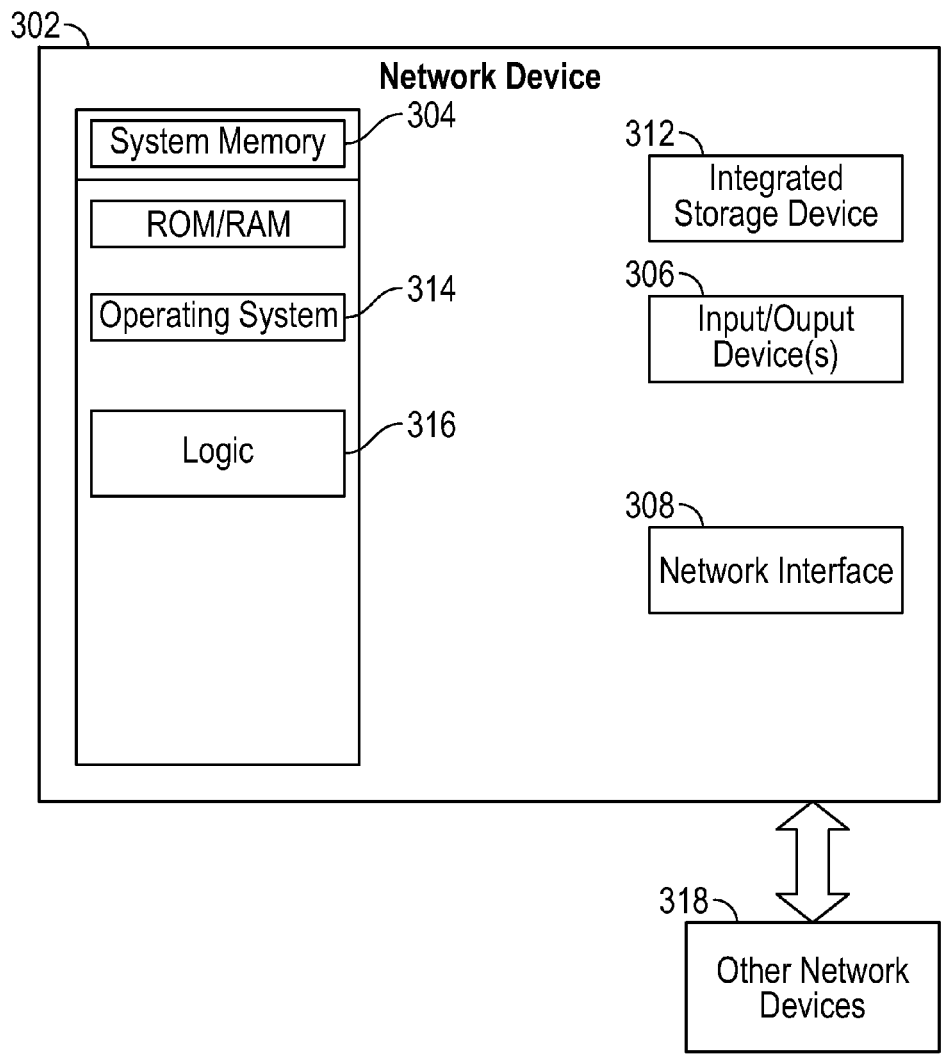
FIG. 3 shows a network device in greater detail.

FIG. 3 shows a network device (such as microserver 110a) in greater detail. A network device may include a processing device 302, a memory 304, input/output (I/O) devices 306, and a network interface 308, each of which may be communicatively coupled via a local interface (not shown). Processing device 302 may be a hardware device for executing software, particularly that which is stored in memory 304. Processing device 302 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 302 may include software at least capable of operating described embodiments of the present disclosure.

Network interface 308 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 306 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 310 may include address, control, and/or data connections to enable appropriate communications among the aforementioned components and provides the interface to communicate with a network controller, a host tracking database, a fabric edge router, or any number of other network devices in networking environment 100.

In some embodiments, a network device may further be configured with an integrated storage device 312 coupled to local interface 310. Storage device 312 may be configured to buffer a plurality of data packets. One or more such buffers may be dedicated buffers for storing captured packets. In some embodiments, storage device 312 may be externally coupled to a content server (not shown).

Memory 304 may include a suitable operating system (O/S) 314. Operating system 314 essentially may control the execution of other computer programs, such as scheduling, input-output control, file and data management, memory management, and communication control and related services. Logic 316 may include executable code to send service requests to the local system, the remote system, a fabric edge router, or any number of other network devices in networking environment 100.

Memory 304 may include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 304 may incorporate electronic, magnetic, optical, semi-conductive, and/or other types of storage media. Note that memory 304 may have a distributed architecture, where various components are situated remotely from one another, which can be accessed by the processing device 302.

The software in memory 304 may include one or more separate programs, each of which comprises an ordered listing of executable instructions for implementing logical functions. In the embodiment shown in FIG. 3, the software in memory 304 may include operating system 314 and logic 316, as explained above. Functionality of logic 316 may be implemented using a single module, or distributed among a plurality of modules.

When logic 316 is in operation, processing device 302 may be configured to execute logic 316 stored within memory 304, to communicate data to and from memory 304, and to generally control operations of logic 316. Logic 316 and O/S 314, in whole or in part, but typically the latter, are read by processing device 302, perhaps buffered within processing device 302, and then executed.

The network controller may include a communication interface suitable for enabling communication (e.g., TCP/IP) of data packets with other network devices 318 of network environment 100. For instance, the communication interface may be of a type suitable for communication over an IP network, a coaxial cable network, an HFC network, and/or wireless network, among others.

Figure 4:
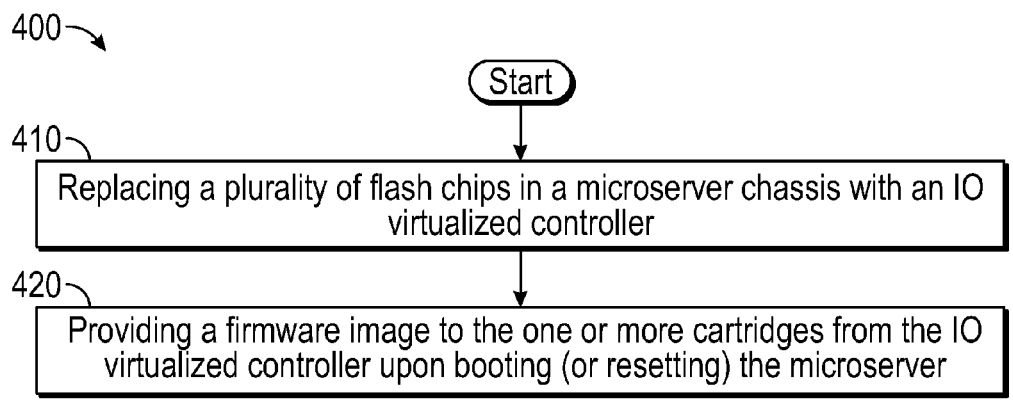
FIG. 4 is a flow chart illustrating embodiments of the present disclosure.

Having described various components of certain embodiments of network environment 100, a method 400 implemented by one or more network devices employed on network environment 100 will now be described with reference to FIG. 4. Method 400 may begin at step 410 where a plurality of flash chips in a microserver chassis may be replaced with an IO virtualized controller.

In some embodiments, the microserver chassis may comprise one or more cartridges (e.g., 8 or 16 cartridges). In some embodiments, the one or more cartridges may operate on different processor architectures. This may be achieved through the use of a firmware image providing a virtualized cross-architecture.

Method 400 may then proceed to step 420. At step 420, a firmware image may be provided to the one or more cartridges from the IO virtualized controller upon booting (or resetting) the microserver. In some embodiments, the firmware image may comprise a firmware patch. In some embodiments of the present disclosure, the microserver may be operated with one or more switching bank multiplexers removed as the multiplexers are not needed in conjunction with use of the IO virtualized controller.

Figure 5:
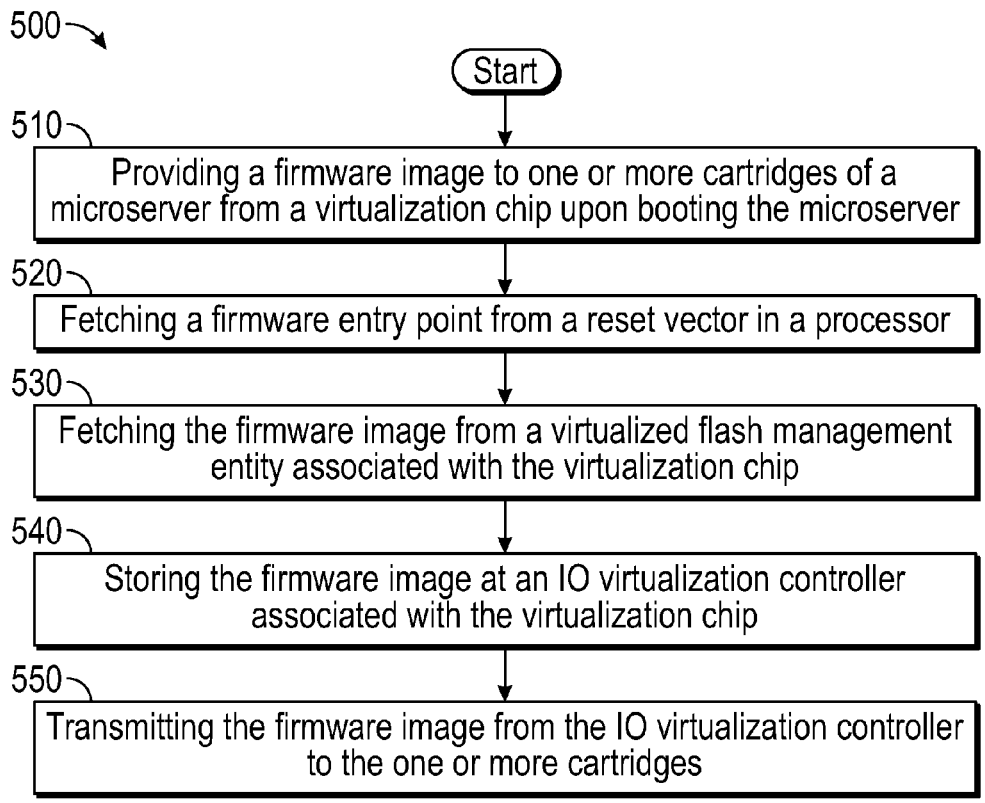
FIG. 5 is a flow chart illustrating embodiments of the present disclosure.

Having described various components of certain embodiments of network environment 100, a method 500 implemented by one or more network devices employed on network environment 100 will now be described with reference to FIG. 5. Method 500 may begin at step 510 where a firmware image may be provided to one or more cartridges of a microserver from a virtualization chip upon booting the microserver. In some embodiments, the one or more cartridges may not comprise flash chips and the microserver may not employ a multiplexer for switching banks. In some embodiments, at least one of the one or more cartridges are located remotely from the virtualization chip (e.g., at a different network device).

Method 500 may then proceed to step 520. At step 520, a firmware entry point may be fetched from a reset vector in a processor. Next, at step 530, the firmware image may be fetched from a virtualized flash management entity associated with the virtualization chip.

Method 500 may next proceed to step 540, where the firmware image may be stored at an IO virtualization controller associated with the virtualization chip. Finally, method 500 may proceed to step 550. At step 550, the firmware image may be transmitted from the IO virtualization controller to the one or more cartridges. In some embodiments of the present disclosure, a server counter value associated with the firmware image may then be incremented. The server counter value may indicate a number of network devices actively referring to the firmware image.

Figure 6:
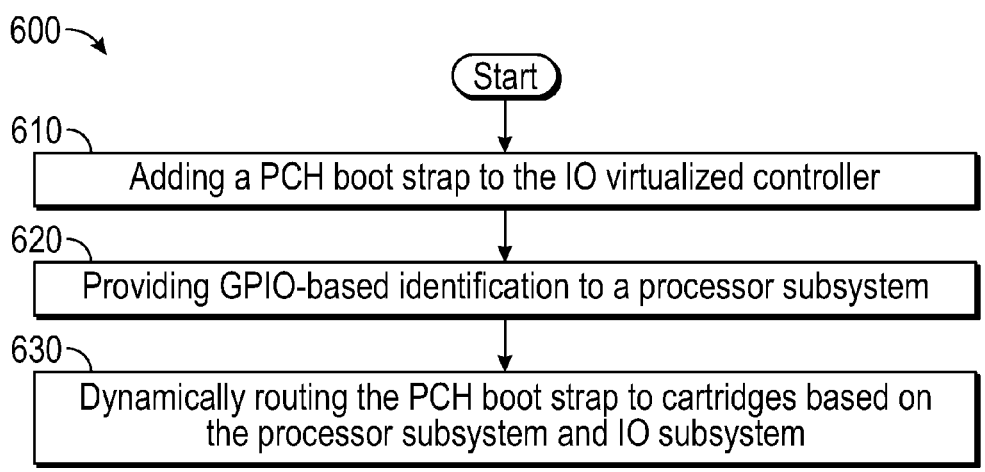
FIG. 6 is a flow chart illustrating embodiments of the present disclosure.

Having described various components of certain embodiments of network environment 100, a method 600 implemented by one or more network devices employed on network environment 100 will now be described with reference to FIG. 6. Method 600 may begin at step 610 where a PCH boot strap may be added to the 10 virtualized controller.

Method 600 may next proceed to step 620. At step 620, GPIO-based identification may be provided to a processor subsystem. Based on the GPIO identification and an IO subsystem, method 600 may proceed to step 630 where the PCH boot strap may be dynamically routed to cartridges based on the processor subsystem and IO subsystem.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
    an Input/Output (IO) virtualized controller comprising a firmware flash management entity;
    a plurality of cartridges not connected to flash chips;
    wherein a Platform Controller Hubs (PCH) boot strap of a cartridge of the plurality of cartridges is added to the IO virtualized controller, the cartridge not being connected to a flash chip;
    wherein the IO virtualized controller is to:
        provide, upon booting of the cartridge, a General Purpose Input and Output (GPIO)-based identification; and
        route the PCH boot strap to the cartridge, wherein the IO virtualized controller to dynamically route the boot strap to the cartridge comprises the IO virtualized controller to:
            populate a virtual peripheral component interconnect (PCI) card with a reset vector comprising first instructions to be executed upon booting of the cartridge, wherein a processor associated with the cartridge is to fetch a booting instructions from the reset vector from the virtual PCI card,
            read a firmware code for booting the cartridge to a local memory accessible to the cartridge, and
            provide the firmware code to the cartridge.

2. The system of claim 1, the cartridge comprises a server management entity, wherein the server management entity is to generate a pulse to power on the cartridge.

3. The system of claim 2, wherein the processor is to fetch the reset vector after receiving a response to the pulse to power on the cartridge, wherein the reset vector comprises a firmware entry point.

4. The system of claim 3, wherein the processor is to execute the firmware code provided by the IO virtualized controller.

5. The system of claim 4, wherein the local memory is a virtualized flash management entity, and wherein the processor is to fetch the firmware code from the firmware flash management entity.

6. The system of claim 5, wherein the firmware code comprises a firmware image, and wherein the IO virtualized controller is further to:
   store the firmware image; and
   provide a copy of the firmware image to the plurality of cartridges.

7. The system of claim 5, wherein the IO virtualized controller is further to increment a server counter value for the firmware image.

8. The system of claim 1, wherein the cartridge comprising a server management entity, and wherein the server management entity is to:
   download a firmware update image from a central location; and
   determine a protocol interface for the firmware update image to the IO virtualized controller.

9. The system of claim 8, wherein the IO virtualized controller is further to create a new file comprising the firmware update image, wherein the firmware update image is automatically applied to the plurality of cartridges upon boot.

10. The system of claim 1, wherein the cartridge is a plug-and-play device and is hot pluggable to a chassis of a micro server.

11. The system of claim 10, wherein the micro server comprises one or more of the plurality of cartridges.

12. The system of claim 10, wherein the micro server is a network device operable to transmit a stream of data packets.

13. The system of claim 10, wherein the micro server is one of a plurality of micro servers stacked to comprise a server rack.

* * * * *